JOSEPH ROIZEN
ALLEN J. TROST
WILLIAM BARNHART
INVENTOR.

BY [signature]
ATTORNEYS

JOSEPH ROIZEN
ALLEN J. TROST
WILLIAM BARNHART
INVENTOR.

BY Flehr & Swain
ATTORNEYS

JOSEPH ROIZEN
ALLEN J. TROST
WILLIAM BARNHART
INVENTOR.

BY [signature]
ATTORNEYS

JOSEPH ROIZEN
ALLEN J. TROST
WILLIAM BARNHART
INVENTOR.

BY Fleha Hof Swain
ATTORNEYS

United States Patent Office 3,075,041

Patented Jan. 22, 1963

3,075,041

RECORDING AND/OR REPRODUCING SYSTEM

Joseph Roizen, Palo Alto, Allen J. Trost, Belmont, and William Barnhart, Palo Alto, Calif., assignors to Ampex Corporation, Redwood City, Calif., a corporation of California Filed July 8, 1959, Ser. No. 825,819
9 Claims. (Cl. 178—5.4)

This invention relates generally to a recording and/or reproducing system and method and more particularly to a recording and reproducing system and method suitable for recording and reproducing monochrome and color television signals.

As is well known, the chrominance information of a color video signal is carried as a pair of frequencies which are modulated on a color sub-carrier employing a two phase modulation system. The phase shift of the sub-carrier over one scanning interval may not exceed five degrees; the absolute sub-carrier frequency cannot deviate more than three parts per million overall and the maximum frequency drift velocity must be maintained within one-tenth cycle per second. When these three conditions are met, the receiver is enabled to appropriately recover the chrominance Q and I information by conventional synchronous demodulation techniques.

Wide band signal intelligence such as monochrome and color video signals may be recorded magnetically on magnetic tape and thereafter reproduced to form the original signal. Suitable recording systems are described in copending applications Serial No. 427,138, filed May 3, 1954, now U.S. Patent No. 2,916,546; No. 506,182, filed May 5, 1955, now U.S. Patent No. 2,916,547; No. 524,004, filed July 25, 1955, now U.S. Patent No. 2,956,114; No. 552,868, filed December 13, 1955, now U.S. Patent No. 2,921,990; No. 614,420, filed October 8, 1956, now U.S. Patent No. 2,968,692; No. 636,536, filed January 8, 1957, now U.S. Patent No. 3,005,869; No. 736,239, filed May 19, 1958, now U.S. Patent No. 3,029,306; and No. 777,168, filed November 6, 1958.

In general, the systems disclosed in said applications employ relatively wide magnetic tape together with a rotating head assembly having a plurality of circumferentially spaced transducer units (e.g. magnetic head units) which sweep successively across the tape as the tape is driven lengthwise. Margins of the tape may be erased to receive sound and speed control or like recordings. The remaining laterally extending track portions are of such length that an end part of one track at one edge of the tape contains a recording which is a duplicate of the end part of the next track at the other edge of the tape. For reproduction, the same or similar head assembly is employed, together with the same or similar tape transport means. Proper synchronization and speed control is maintained whereby the head units sweep over the recorded tracks, with one unit commencing to scan over a track portion before the preceding scan has been completed.

Switching (see applications 427,138 and 614,420) is employed whereby the output of the head units is combined and duplicate information is eliminated. The inherent characteristics of such a system may cause serious noise pulses or spikes in the video and other portion of the signal. Such noise components can be attributed to various causes, including momentary drop-outs and switching. They are objectionable for several reasons, including the fact that they tend to cause a poor signal to noise ratio for a system, and because a signal having such noise component is not well suited for application to standard television transmitters, or standard receivers.

Apparatus of the type is suitable for recording amplitude modulated signals. However, it has been found desirable to employ a novel form of frequency modulated carrier recording in accordance with the system and method disclosed in copending application Serial No. 524,004, above.

When a frequency modulated video signal is recorded on magnetic tape in the manner previously described, and thereafter transduced and demodulated to produce a reproduced composite signal, certain undesirable frequency components due to the carrier are present in addition to the noise components previously mentioned. Such frequency components appear particularly on the blanking pedestal and synchronizing pulses. Standard television transmitters are provided with amplifying networks which reform the composite wave with respect to the shape of the synchronizing pulses, and which apply clamping for D.C. restoration. When a reproduced composite video signal is applied to such an amplifying network from a recording and reproducing system of the type described, noise components present tend to cause undesirable clamping in the video portions of the wave, with the result that substantial portions of the desired video signal may be clamped improperly.

Additionally, assuming use of FM recording of the character described above, the frequency components present on both the front and back porches of the blanking pedestal and on the horizontal synchronizing pulses tend to interfere with the horizontal, vertical and burst synchronizing functions.

Any variations of speed of the rotating head assembly, tape dimensions, etc., lead to errors in the frequency and phase of the recorded and reproduced signal intelligence. These variations may introduce timing and phase errors which are not acceptable in color video systems, although such errors may be acceptable in monochrome video systems. In copending application Serial No. 777,168, there is described a system for recovering the Q and I signal components from a composite signal by employing a form of decoding which takes place on a line by line basis. The local frequency is derived from the preceding color burst.

In view of the foregoing, it is a general object of the present invention to provide a system and method for recording and reproducing monochrome and color video signals which provide a good quality composite output signal, suitable for handling in a normal manner by the electronics of a television transmitter and receiver.

It is another object of the present invention to provide a recording and reproducing system suitable for recording and reproducing monochrome and color television signals and for providing an output signal having reformed synchronizing pulses and burst flags, together with noise free blanking pedestals.

It is a further object of the present invention to provide a system of the above character in which a switching signal for switching from one head to another is derived from the previous synchronizing pulses and the switching is adjustable over the blanking interval of the succeeding pulse.

It is another object of the present invention to provide a processing amplifier network for separately generating pulses for gating operations and to control the addition of vertical and horizontal synchronizing pulses to the signal and including means for generating a separate synchronizing pulse for substitution in the signal in the event transients cause loss of synchronizing pulses.

These and other objects of the invention will become more clearly apparent from the following description when taken in conjunction with the accompanying drawing.

Referring to the drawing.

Figure 1:
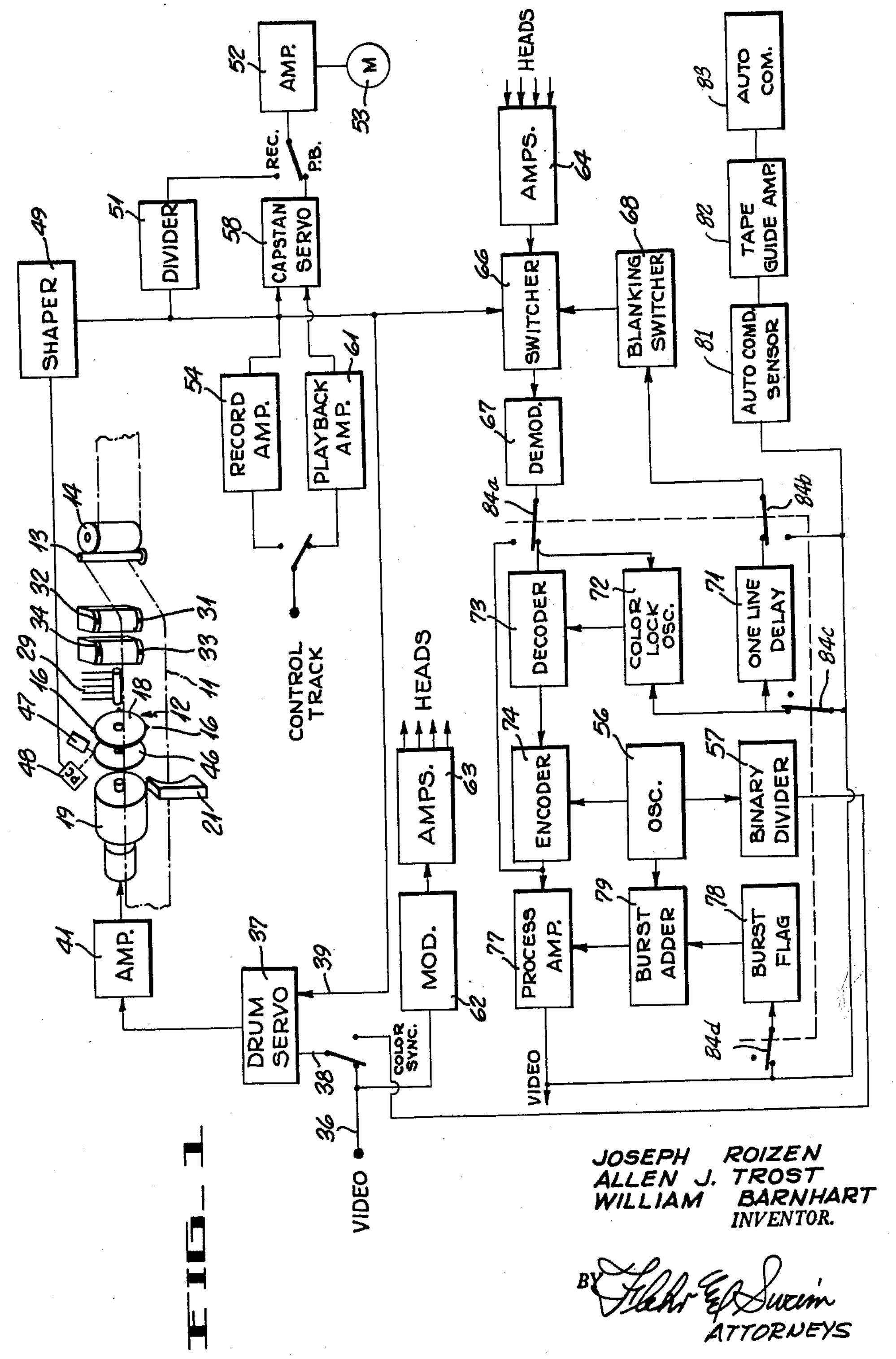
FIGURE 1 is a diagram schematically illustrating a tape recording and reproducing system incorporating the present invention.

Referring to FIGURE 1, the magnetic tape 11 is driven lengthwise past the transducing head assembly 12 by means of a capstan drive 13 acting in conjunction with a capstan idler 14. A plurality of transducing heads or units 16 are carried on the periphery of a disc or drum 18 which is driven by synchronous motor 19. Suitable guide means 21 serve to hold the tape in conformity with the circular shape of the head drum whereby the tape is engaged successively by the heads as they sweep across the same.

The tape 11 is supplied from a supply reel and is wound onto a take-up reel (not shown). The tape is guided past the transducing head assembly by suitable self-aligning guide posts and rollers (not shown). The supply and take-up reels may be carried on turntables in accordance with customary practice and suitable motors may be provided for the turntables.

In operation, one head 16 is always in contact with the tape. The heads are connected to the electronic elements of a system by a commutator 29 which is schematically illustrated in FIGURE 1. The commutator may, for example, include slip rings connected to each of the heads and brushes serving to make sliding contacts with the rings.

During recording of the signal intelligence, the rotational velocity of the head drum 18 and of the capstan 13 are maintained with a specified relationship. During the reproducing process, the relationship of rotational velocity of the head drum 18 and capstan 13 is maintained with the same relationship (within narrow limits) as during recording. For this purpose, a control signal is recorded on a control track along the lower edge of the tape by magnetic transducing unit 31. The control signal is recorded as a control track during recording and during reproduction, it is reproduced, amplified and used to control the relative speeds of the drum and capstan in a manner to be presently described. A recording head 32 may serve to record sound information on the other edge of the magnetic tape. Sound track and control track erase heads 33 and 34 may precede the heads 31 and 32.

The input video signal 36 may be employed to provide a reference frequency to the drum servo 37. The reference frequency may also be derived from a local frequency source, such as a crystal controlled oscillator provided with a frequency divider. The drum servo 37 receives the reference frequency on the line 38. A signal whose frequency is dependent upon the speed of rotation of the head drum is received along the line 39. This signal is derived by a photoelectric system, as will be presently described. The drum servo provides an output signal to the amplifier 41 which drives the motor 19. The speed of the motor is dependent upon the reference frequency (line 38) and is controlled by the signal on line 39 to compensate for variations in speed due to variations in load whereby the rotational velocity is substantially constant and hunting of the motor is minimized. A servo system for controllng the rotational velocity of the motor 19 is described in copending application Serial No. 754,098, filed August 8, 1958.

A signal which has a frequency dependent upon the speed of rotation of the head drum may be derived by employing a photoelectric system which includes a disc 46 which is coated half black and half white. A suitable light source 47 shines light on the periphery of the disc. The photocell 48 receives the reflected light and forms an electrical signal of approximately squarewave form having a frequency proportional to the speed of the driving motor 19.

The squarewave may be passed through a shaper 49. During recording, the output signal from the shaper 49 is applied to a divider 51 and thence to an amplifier 52 which serves to drive the capstan motor 53. The capstan motor is driven at a rotational velocity which is directly related to the rotational velocity of the head drum 18. The tape moves a predetermined distance lengthwise during each complete revolution of the head drum.

The output from the shaper 49 is also applied to a record amplifier circuit 54 and the amplified signal is applied to a control track head which serves to form a control record along one edge of the tape. The output of the shaper 49 is also applied to the drum servo along the line 39, as previously described, to control the rotational velocity of the motor 19.

During reproduction, the reference frequency for the drum servo may be derived from a local oscillator 56 and a divider 57 which provides a signal of suitable frequency to the drum servo. The reference frequency is compared with the signal from the photoelectric system on line 39 and the servo develops the signal applied to the drive amplifier 41, as previously described. This signal from the shaper is also applied to a capstan servo 58 which also receives a control signal from the control track playback amplifier 61. These signals are compared and produce a resultant signal whose frequency is a function of the phase difference between the signals from the control track and photocell. The capstan motor is enslaved to the control track output so that it rotates at exactly the same relationship to the revolving drum 18 as it did during the recording process. A suitable control system is described in copending application Serial No. 506,182, above.

The record electronics may include suitable means for producing a modulated carrier together with suitable recording amplifiers. FM recording is preferred, although AM may be used. Assuming the use of FM recording, the record electronics can consist of a modulator 62 and a record amplifier 63 which has channels associated with each of the transducer units mounted in the drum 18. If FM recording is employed, it can be of the type disclosed in copending application Serial No. 552,868 above. During reproduction, the output of each head is applied individually to preamplifiers 64. The preamplifiers are connected to a switcher 66. From the switcher, a single channel frequency modulated signal is fed to the demodulator 67.

It is apparent that during the reproduction it is necessary to derive the amplified output signal from one head at a time, switching from one preamplifier to the next at a moment in the signal when minimum disturbance will be introduced into the reproduced signal. The switcher may be of the type described in copending application Serial No. 614,420, above. A blanking switcher 68 serves to control the occurrence of switching. For this purpose in video signal recording, a signal is derived in the processing amplifier, to be presently described, from the synchronizing pulses. A delay corresponding to the time for one scan line is introduced by the one line delay 71. The delay is so selected that it is just short of one line so that the blanking switcher causes the switching to occur on the front porch of the synchronizing waveform rather than on the back porch. When reproducing color television signals, interference with the color bursts is minimized.

In color video signal recording and reproduction, the demodulated signal is applied to a color lock oscillator 72 which serves to generate pulsed oscillations with each pulse having a frequency and phase corresponding to the preceding color burst. The pulsed oscillations are applied to a decoder 73 which serves to decode the color information and provide the Y, I and Q component signals. Decoding is performed on a line by line basis with almost instantaneous control of the local signal. The component color signals are recorded with a high degree of fidelity. Line by line demodulation (decoding) is described in copending applications Serial No. 721,472, filed March 14, 1958, and No. 777,168, filed November 6, 1958.

The component signals are then applied to an encoder 74 which serves to encode the information and form a new composite color video signal. The encoder for the local frequency is derived from the crystal controlled oscillator 56 which is designed to operate at the color subcarrier frequency.

The composite signal is then applied to a processing amplifier 77 which strips off synchronizing information and color burst, reconstitutes the information and adds it to the video information once more to produce a reconstituted composite video signal suitable for application to transmitters for transmission and reception by standard transmitters and receivers.

Processing amplifier systems are disclosed in copending applications Serial No. 636,536, filed January 28, 1957, and No. 736,239, filed May 19, 1958. An improved system will be presently described.

The output from the processing amplifier is employed to operate a burst flag 78 which controls the burst flag adder 79 whereby clean bursts from the oscillator are added to the video signal in the processing amplifiers.

The output signal from the processing amplifier is also employed in automatic compensation system. The system serves to continuously adjust the pressure between the transducer units 16 and the tape 11 whereby timing errors due to expansion of the tape, wear, and the like, are automatically compensated. Thus, the signal is applied to an automatic compensation sensor 81 which derives an error signal proportional to the error in the reproduced signal. The error signal is applied to a tape guide amplifier 82. The amplified signal drives an automatic compensation means 83 which serves to continuously control the pressure between the tape and units. A suitable automatic compensation system is described in copending application Serial No. 720,329, filed March 10, 1958.

As previously described, the one line delay 71 provides a synchronizing pulse source in which the pulses have adjustable delay. The pulses are used in the blanking switcher to control the switching time so that switching transients will occur during blanking time but prior to the color burst signal. The color lock circuit 72 provides a gating circuit to select the burst signal from the composite video train so that it may be employed to energize a start-stop oscillator and to immunize the start-stop oscillator from noise during line time when the burst signal is not present. The circuit further serves to regenerate a continuous 3.58 megacycle signal from independent burst signals at the start of each line allowing the signals to follow very closely the frequency and phase of the initiating bursts as described in copending application Serial No. 777,168, above. The color lock also includes a color signal circuit used to key off circuits unnecessary in monochrome operation, when burst signals are not present. The circuit forms a signal which serves to disconnect the decoder 73, encoder 74, burst adder 79, oscillator 56, color lock oscillator 72, one line delay 71, binary divider 57, and burst flag adder 78 from the system when there is no burst signal present. This is schematically illustrated by the single pole, double throw relay including contacts 84*a–d* (shown in normal position for color recording and reproduction) which serves to disconnect these portions of the circuit and to connect the processing amplifier 77 directly to the demodulator 67 and the output of the processing amplifier directly to the blanking switcher 68 for monochrome reproduction. It is, of course, understood that the switching can be carried out electronically and that the relay is merely illustrative of the principle.

Figures 2, 5:
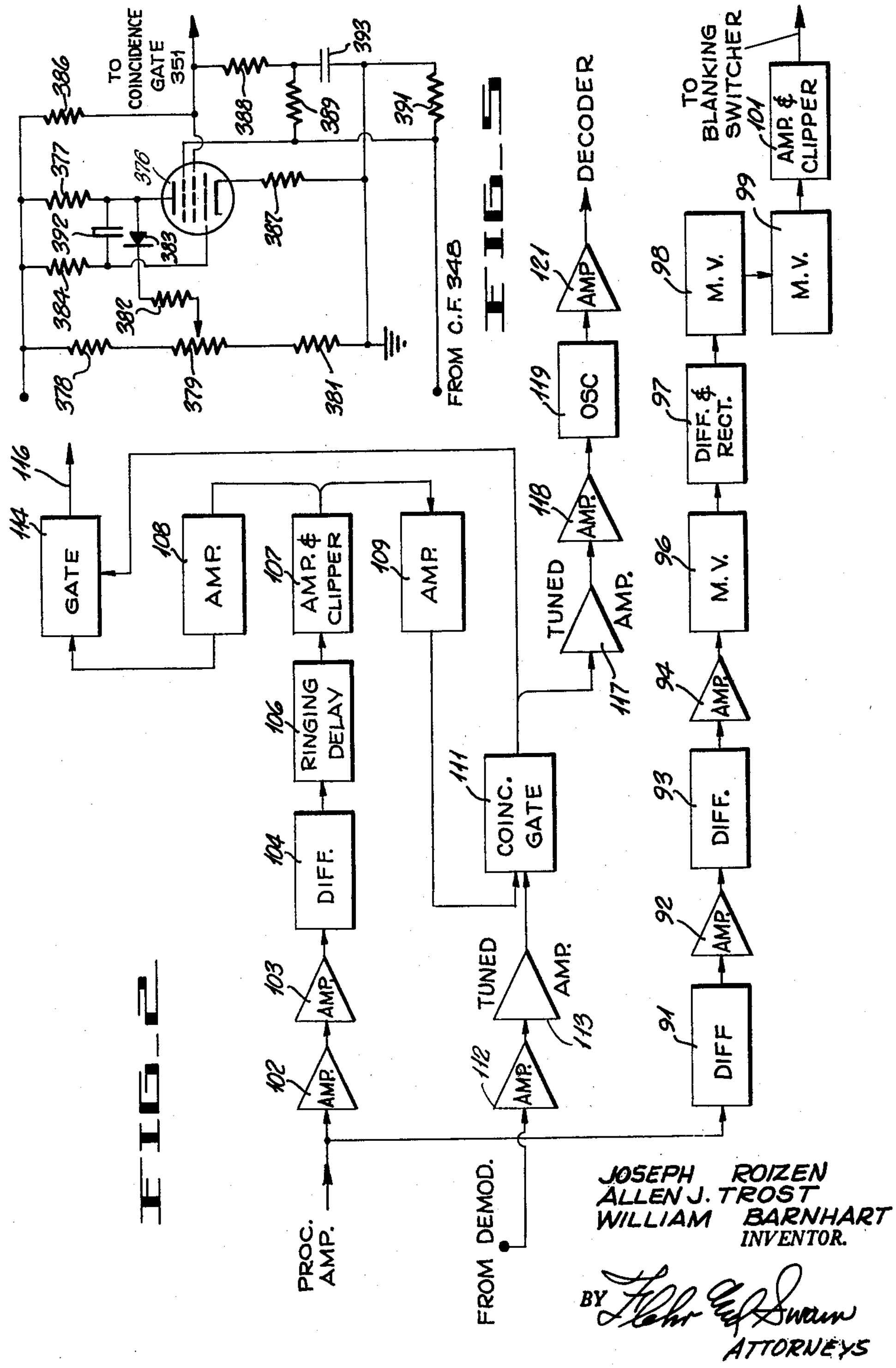
FIGURE 2 is a block diagram illustrating the color lock oscillator and one line delay shown in FIGURE 1.
FIGURE 5 is a circuit diagram showing a delay phantastron for generating local sync pulses.

Referring to FIGURE 2, a block diagram of the one line delay 71 and color lock oscillator circuits is illustrated. The one line delay is represented in the lower part of the figure. Negative synchronizing pulses from the processing amplifier are differentiated 91, amplified 92, and then again differentiated 93, and amplified 94. The pulses are then applied to a multi-vibrator 96. The duty cycle of the multivibrator is adjusted so that its rise time is coincident with the start of the horizontal synchronizing pulses. The output of the multivibrator 96 is differentiated and rectified at 97 to pass only the negative pulses of the differentiated signal. The negative pulses trigger another multivibrator 98 whose trailing edge occurs approximately one horizontal line after the originating synchronizing pulse. The position of this trailing edge is adjustable to occur from five microseconds before to a few microseconds after the horizontal blanking time. This signal is used to trigger a third multivibrator 99 which has a very short duty cycle and whose output is a four to five microsecond pulse at the horizontal line rate. The output of this is amplified and clipped 101, and applied to the blanking switcher which controls the occurrence of switching.

These output pulses are adjustable to occur at any selected point in the blanking area and are normally set to occur during synchronizing time.

The incoming synchronizing pulses from the processing amplifier are also applied to a two stage amplifier 102 and 103. The output of the amplifier 103 is differentiated 104 and applied to a ringing delay circuit 106. The ringing delay circuit is adjustable whereby it provides a pulse of proper width suitable for keying the burst signal. The output from the delay circuit is applied to an amplifier-clipper stage 107 and then to amplifiers 108 and 109. The output from amplifier 109 is applied to coincidence gate 111.

The composite signal from the demodulator 67 is amplified 112 and applied to a tuned amplifier 113. The amplified signal is also applied to the coincidence gate. The coincidence gate passes the color burst when the burst signal and the gating signal from the amplifier 109 are coincident. The output of the coincidence gate 111 is applied to the gate 114 which receives a signal from the amplifier 108. When the burst signal is present at the gate 114, the output voltage at the terminal 116 is relatively low. However, when the burst signal is not present (during monochrome operation, for example), the gate 114 conducts. The positive pulses from the amplifier 108 are rectified and build up to a voltage which is sufficient for operating a switching circuit such as that designated by relays 84*a–d*.

Bursts from the coincidence gate 111 are also applied to a tuned amplifier 117, amplified at 118 and applied to excite a ringing oscillator 119 which forms pulsed oscillations. The oscillations have a frequency and phase corresponding to the bursts applied from the amplifier 118. The output of the oscillator 119 is amplified 121 and applied to the decoder 73.

Figure 3:
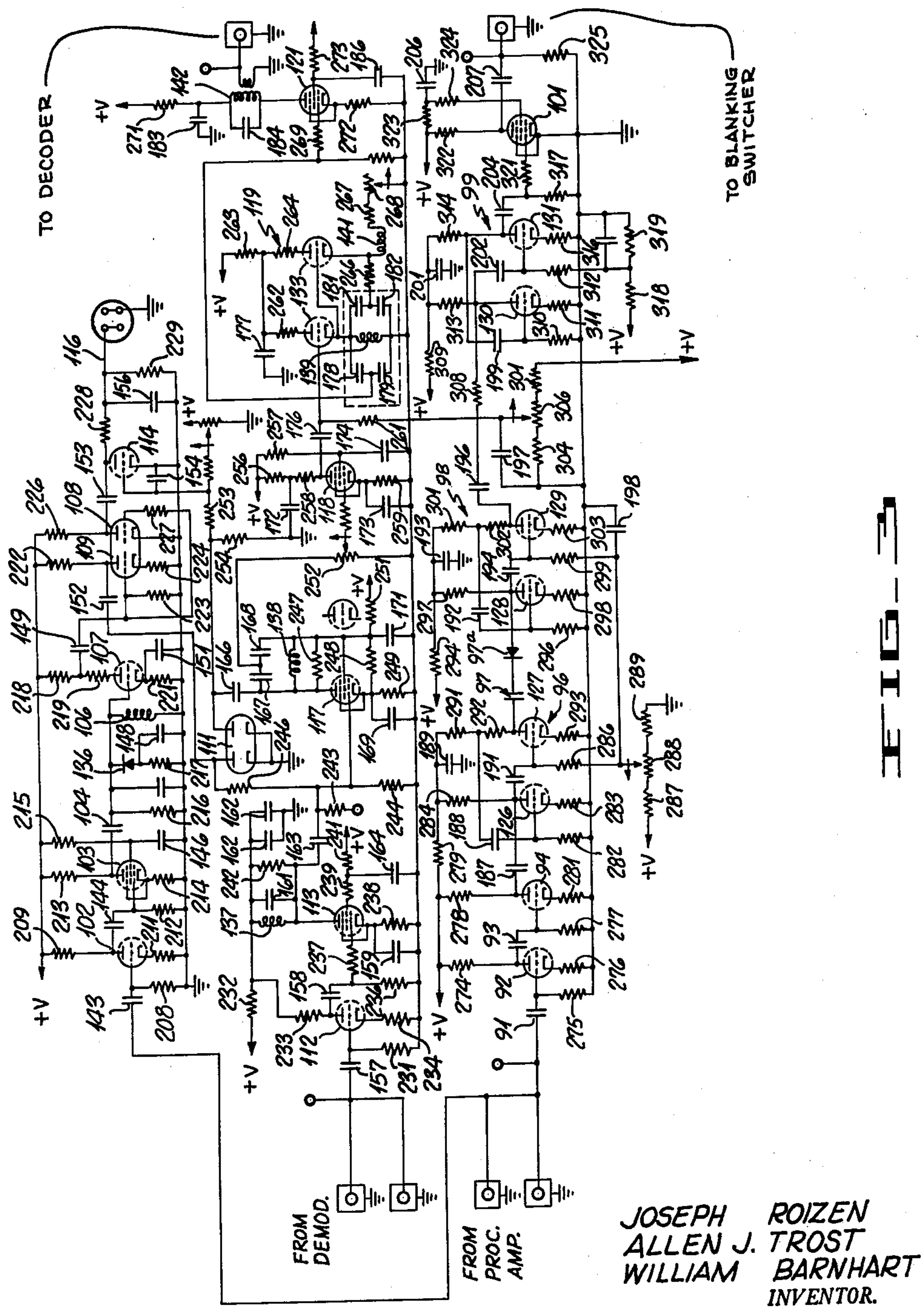
FIGURE 3 is a detailed circuit diagram of the color lock and one line delay.

Referring to FIGURE 3, a complete circuit diagram of the system depicted in the block diagram of FIGURE 2 is shown. The reference numerals applied to the blocks of FIGURE 2 are applied to the vacuum tubes in FIGURE 3 which form part of the circuit performing the functions of the corresponding blocks.

A circuit in accordance with FIGURE 3 having the following applied voltages and component values was constructed and tested:

Voltages

+V ---------------------------------- 250 volts.

Vacuum Tubes

| | | | |
|---|---|---|---|
| **92** | 12AX7. | **114** | 12AT7. |
| **94** | 12AX7. | **117** | 6AN8. |
| **101** | 6CL6. | **118** | 6CL6. |
| **102** | 648. | **121** | 6CL6. |
| **103** | 648. | **126** | 12AX7. |
| **107** | 12AT7. | **127** | 12AX7. |
| **108** | 6CG7. | **128** | 12AX7. |
| **109** | 6CG7. | **129** | 12AX7. |
| **111** | 6AL5. | **130** | 12AX7. |
| **112** | 6U8. | **131** | 12AX7. |
| **113** | 6U8. | **133** | 6CG7. |

Diodes

| | |
|---|---|
| **97*a*** | DR-497 |
| **136** | DR-497 |

Inductors

| | |
|---|---|
| **106** | 2-14 MH (millihenries). |
| **137** | 29-55.5 mH (microhenries). |
| **138** | 36-64 mH. |
| **139** | 18-36 mH. |
| **141** | 2.5 MH. |
| **142** | 18-36 mH. |

Capacitors

| | | | |
|---|---|---|---|
| **91** | 100 mf. | **173** | .015 mf. |
| **93** | 100 mf. | **174** | 10 mf. |
| **97** | 22 mf. | **176** | .015 mf. |
| **104** | 100 mf. | **177** | 10 mf. |
| **143** | 0.1 mf. | **178** | 27 mf. |
| **144** | 0.001 mf. | **179** | 100 mf. |
| **146** | 10 mf. | **181** | 100 mf. |
| **147** | 82 mf. | **182** | 100 mf. |
| **148** | 390 mf. | **183** | 10 mf. |
| **149** | .0047 mf. | **184** | 50 mf. |
| **151** | .01 mf. | **186** | 10 mf. |
| **152** | 22 mf. | **187** | 100 mf. |
| **153** | 510 mf. | **188** | .015 mf. |
| **154** | .01 mf. | **189** | 10 mf. |
| **156** | .22 mf. | **191** | 250 mf. |
| **157** | 100 mf. | **192** | 0.15 mf. |
| **158** | 100 mf. | **193** | 10 mf. |
| **159** | .01 mf. | **194** | 200 mf. |
| **161** | .0033 mf. | **196** | 22 mf. |
| **162** | .0033 mf. | **197** | 0.1 mf. |
| **163** | 33 pf. | **198** | .1 mf. |
| **164** | .01 mf. | **199** | .015 mf. |
| **166** | .0022 mf. | **201** | 10 mf. |
| **167** | 47 mf. | **202** | 47 mf. |
| **168** | 270 mf. | **203** | .015 mf. |
| **169** | 0.1 mf. | **204** | .022 mf. |
| **171** | .22 mf. | **206** | 10 mf. |
| **172** | 10 mf. | **207** | 0.1 mf. |

Resistors

| | | | |
|---|---|---|---|
| **208** | 220K ohm. | **229** | 1 meg. |
| **209** | 10K ohm. | **231** | 220K ohm. |
| **211** | 100 ohm. | **232** | 5.6K ohm. |
| **212** | 220K ohm. | **233** | 2.2K ohm. |
| **213** | 3.9K ohm. | **234** | 100 ohm. |
| **214** | 68 ohm. | **236** | 330 ohm. |
| **216** | 10K ohm. | **237** | 220K ohm. |
| **217** | 15K ohm. | **238** | 68 ohm. |
| **218** | 4.7K ohm. | **239** | 100 ohm. |
| **219** | 10K ohm. | **241** | 39K ohm. |
| **221** | 820K ohm. | **242** | 10K ohm. |
| **222** | 10K ohm. | **243** | 1K ohm. |
| **223** | 3.3K ohm. | **244** | 2.2 meg. |
| **224** | 1K ohm. | **246** | 8.2K ohm. |
| **226** | 47K ohm. | **247** | 5.6K ohm. |
| **227** | 220 ohm. | **248** | 68K ohm. |
| **228** | 470K ohm. | **249** | 470 ohm. |

| | | | |
|---|---|---|---|
| **251** | 1K ohm. | **289** | 100K ohm. |
| **252** | 500 ohm. | **291** | 10K ohm. |
| **253** | 2.2 meg. | **292** | 10K ohm. |
| **254** | 1 meg. | **293** | 10 ohm. |
| **256** | 2.2K ohm. | **294** | 22K ohm. |
| **257** | 27K ohm. | **295** | 22K ohm. |
| **258** | 15K ohm. | **296** | 220K ohm. |
| **259** | 56 ohm. | **297** | 22K ohm. |
| **261** | 1 meg. | **298** | 10 ohm. |
| **262** | 75 ohm. | **299** | 180K ohm. |
| **263** | 2.2K ohm. | **301** | 10K ohm. |
| **264** | 75 ohm. | **302** | 10K ohm. |
| **266** | 10K ohm. | **303** | 10 ohm. |
| **267** | 10K ohm. | **304** | 62K ohm. |
| **268** | 10K ohm. | **306** | 500K ohm. |
| **269** | 100 ohm. | **307** | 100K ohm. |
| **271** | 2.2K ohm. | **308** | 33K ohm. |
| **272** | 56 ohm. | **309** | 22K ohm. |
| **273** | 27K ohm. | **311** | 10 ohm. |
| **274** | 15K ohm. | **312** | 82K ohm. |
| **276** | 1K ohm. | **313** | 22K ohm. |
| **277** | 560K ohm. | **314** | 3.3K ohm. |
| **278** | 3.3K ohm. | **316** | 10 ohm. |
| **279** | 22K ohm. | **317** | 560K ohm. |
| **281** | 1K ohm. | **318** | 220K ohm. |
| **282** | 220K ohm. | **319** | 100K ohm. |
| **283** | 10 ohm. | **321** | 100 ohm. |
| **284** | 22K ohm. | **322** | 10K ohm. |
| **286** | 180K ohm. | **323** | 56K ohm. |
| **287** | 100K ohm. | **324** | 100 ohm. |
| **288** | 100K ohm. | **326** | 75 ohm. |

A circuit in accordance with the foregoing delivered a delayed synchronizing pulse output which could be positioned within the synchronizing portion of the next synchronizing waveform. The circuit also generated a pulsed oscillation which followed very closely in phase and frequency with the frequency and phase of the preceding color burst. Furthermore, the circuit provided an output voltage for controlling associated switching circuits, which was zero volts when burst was present, and which attained a value of −40 volts when burst was not available.

Figure 4:
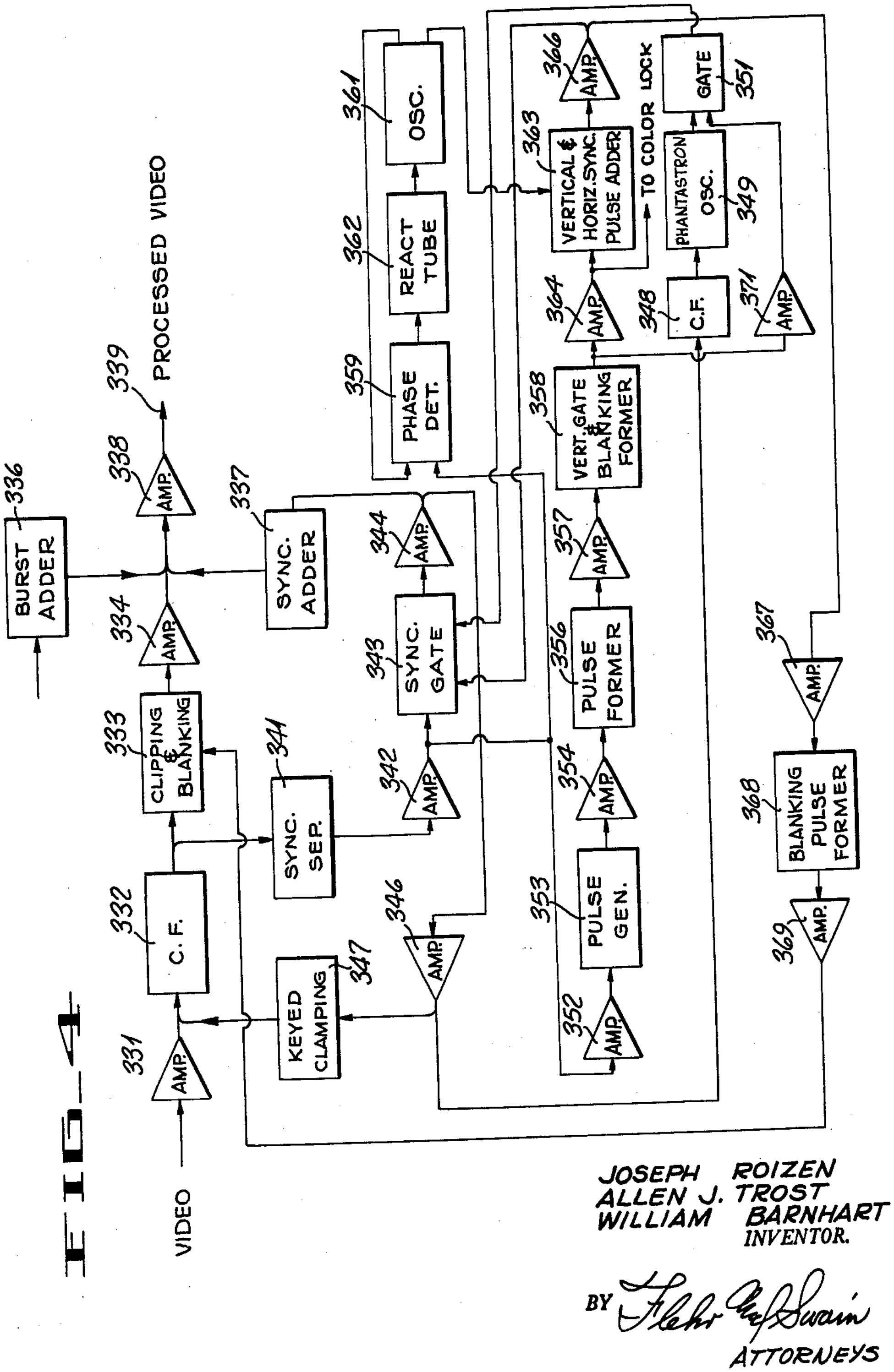
FIGURE 4 is a block diagram of an improved processing amplifier.

FIGURE 4 is a block diagram illustrating a processing amplifier net work for processing the output signal from the encoder. The incoming encoded composite video signal is applied to a multi-stage vacuum tube amplifier 331. Cathode follower 332 receives the amplified video signal and applies the video to the clipping and blanking stages 333 which clip the signal with respect to both black and white portions of the video signal and which blanks out the synchronizing waveforms and color burst in response to a blanking signal. The output from the clipping and blanking stage is applied to an amplifier 334. Color burst is added from a color burst adder 336 and synchronizing waveforms from a sync adder 337. The combined signal is amplified by amplifier 338 and provides the processed video signal at the terminal 339.

A synchronizing pulse separator 341 separates the synchronizing pulses from the output of the cathode follower 332 and applies them to a pulse amplifier 342. The amplified synchronizing pulses from amplifier 342 are applied to a synchronizing pulse gate 343 of the electronic type. This gate serves to gate reformed synchronizing pulses to the amplifier 344 and thence to the sync adder 337 where they are added to the video information which has been stripped of synchronizing waveforms and color burst.

Synchronizing pulses from the amplifier 344 are also applied to the amplifier 346. The amplified pulses drive the keyed clamping circuit 349 whose output provides D.C. restoration to the signal from the amplifier 331.

Synchronizing pulses from the amplifier 346 are also applied to a cathode follower 348 and thence to a phantastron oscillator 349 which form a pulse whose width equals the synchronizing information. The pulse from the phantastron 349 is applied to gates 351. Vertical drive, to be presently described, gates out the phantastron pulse during the vertical period. The phantastron pulse is added to old synchronizing information to fill in holes left by transients when there is no vertical drive.

The synchronizing pulses from the amplifier 342 are applied to an amplifier 352 which is selective to the vertical synchronizing pulses. The pulses from the amplifier 352 are applied to a pulse generator 353, amplified 354, applied to a pulse former 356, again amplified 357, and then applied to a vertical gate and blanking former 358. The output of the vertical gate and blanking former is a train of precise vertical gating pulses.

Pulses from the amplifier 342 are also applied to control the frequency of an oscillator circuit which provides controllable horizontal synchronizing pulses. Such an oscillator may be one of the multivibrator type or may be a tuned oscillator. A suitable tuned oscillator may include a phase detector 359 which produces a D.C. voltage which is a function of the phase difference between the signal from the amplifier 342 and the output of oscillator 361. The D.C. voltage is applied to the grid of a reactance tube 362 which is one of the frequency determining elements of the oscillator 361. The oscillator functions normally at the frequency 15.75 kc., but the frequency is modified up and down by the signal from the phase detector 359. The output of the oscillator is applied to the vertical and horizontal gating pulse adder 363. The horizontal gating waveforms have a frequency which varies in accordance with the input signal from the amplifier 342.

The vertical pulses from the vertical gate and blanking former 358 are amplified 364 and also applied to the vertical and horizontal synchronizing pulse adder 363. The output of the pulse adder is amplified 366 and applied to the sync gate 343. The gate serves to pass the reformed synchronizing pulses from the amplifier 366 to the amplifier 344.

Output pulses from the amplifier 366 are also applied to an amplifier 367, a blanking pulse former 368 and an amplifier 369 which form blanking pulses. The blanking pulses are applied to the clipping and blanking circuit 333 to blank out the synchronizing pulses and color bursts from the unprocessed video signal so that clean pulses may be added.

Vertical synchronizing pulses from the vertical gate and blanking former 358 are amplified 371 and applied to the gate 351. In the absence of vertical synchronizing pulses from amplifier 371, the pulses from the phantastron oscillator are passed by the gate 351 and applied to the sync gate 343.

A suitable phantastron oscillator for operating to form pulses in accordance with the invention is illustrated in FIGURE 5. The oscillator includes a pentode 376. Plate voltage is applied through the resistor 377. The resistive voltage divider including resistors 378, 379 and 381 provides control voltage to the plate through resistor 382 and diode 383. The triggering pulse is applied to the suppressor grid.

A circuit in accordance with the foregoing was built and tested in which the voltages and components were as follows:

| | |
|---|---|
| Voltages, $V_1$ | 250 volts. |
| Vacuum tube, **376** | 6AS6. |
| Diode, **383** | DR 497. |

Resistors

| | | | |
|---|---|---|---|
| **377** | 1 megohm. | **386** | 47K ohm. |
| **378** | 1.5 megohm. | **387** | 3.3K ohm. |
| **379** | 100K ohm. | **388** | 10K ohm. |
| **381** | 47K ohm. | **389** | 10K ohm. |
| **382** | 22K ohm. | **391** | 4.7K ohm. |
| **384** | 470K ohm. | | |

Capacitors

| | | | |
|---|---|---|---|
| **392** | 100 mf. | **393** | 0.1 mf. |

A circuit in accordance with the foregoing served to form an output pulse with a width equal to the synchronizing pulses.

We claim:

1. A system for processing video information including synchronizing pulses comprising means for blanking out the synchronizing pulses, synchronizing pulse separating means serving to separate out the synchronizing pulses, means responsive to the separated synchronizing pulses forming new synchronizing pulses in response thereto, gating means connected to receive the new synchronizing pulses and adapted to gate the same in response to the original synchronizing pulses, an adder serving to receive the gated synchronizing pulses and serving to add the same to the blanked video signal to thereby re-insert synchronizing pulses in the signal, means responsive to the gated synchronizing pulses for generating substitute synchronizing pulses, gating means for receiving said substitute synchronizing pulses and passing the same to the gating means in the absence of new synchronizing pulses whereby synchronizing pulses are added during transients in the signal.

2. A system for processing video signal intelligence of the type including video information, synchronizing pulses and color bursts comprising blanking means serving to receive said signal and blank out the synchronizing pulses and color bursts, synchronizing pulse separating means serving to receive said signal and to separate out the synchronizing pulses, means responsive to said separated synchronizing pulses for forming new synchronizing pulses, gating means connected to receive said new synchronizing pulses and adapted to gate the same in response to the original synchronizing pulses, an adder serving to receive said gated synchronizing pulses and serving to add the same to the blanked video signal to thereby re-insert synchronizing pulses in the signal, means responsive to the gated synchronizing pulses for generating substitute synchronizing pulses, gating means for receiving the substitute synchronizing pulses and passing the same to the gating means in the absence of new synchronizing pulses whereby pulses are added during transients, and means serving to form color burst information, and means for adding the burst information to said processed video signal whereby a re-processed signal including video signal intelligence, color bursts and synchronizing information is formed.

3. A system for recording and reproducing color television signals of the type including video signal intelligence, synchronizing pulses and color bursts recorded in the form of successive tracks extending crosswise of the recording medium and spaced lengthwise in the direction of length of the medium including means for reproducing said recording comprising at least two transducer units mounted on a rotating drum and adapted to sweep successively across the tape along the track portions, switching means serving to selectively switch from one transducer unit to another in response to a switching signal, means for deriving a switching signal in response to the reproduced synchronizing waveforms, said signal serving to cause switching during the blanking interval of the next succeeding synchronizing waveform, means serving to receive the reproduced signal and serving to derive an output freuqency having a frequency and phase dependent upon the last preceding color burst, decoding means receiving said local frequency and said demodulated signal and serving for forming the component signals from the reproduced color signal, encoding means receiving the component signals for forming a new composite signal, and processing means receiving said encoded signal for forming a processed output signal.

4. A system as in claim 3 wherein said processing means comprise blanking means for receiving said signal and blanking out the synchronizing pulses and color bursts, synchronizing pulse separating means receiving said signal for separating out the synchronizing pulses, means responsive to said separated synchronizing pulses for forming new synchronizing pulses, gating means connected to receive said new synchronizing pulses and adapted to gate the same in response to the original synchronizing pulses, an adder serving to receive said gated synchronizing pulses and serving to add the same to the blanked video signal to thereby re-insert synchronizing pulses in the signal, means responsive to the gated synchronizing pulses for generating substitute synchronizing pulses, gating means serving to receive the substitute synchronizing pulses and serving to pass the same to the gating means in the absence of new synchronizing pulses whereby pulses are added during transients, means serving to form color burst information, and means for adding the burst information to said processedw video signal whereby a re-processed signal including video signal intelligence, color bursts and synchronizing information is formed.

5. In a system for reproducing a recording of a carrier frequency which has been frequency modulated by a composite color video signal including video intelligence, synchronizing waveforms and color bursts on a blanking pedestal, said recording being in the form of successive tracks extending crosswise of a recording medium and spaced lengthwise in the direction of the length of the medium, means for reproducing said recording comprising at least two transducer units mounted on a rotating drum and adapted to sweep successively across the tape along the tracks, switching means serving to selectively switch from one transducer unit to another in response to a switching signal, demodulating means serving to receive the reproduced frequency modulated carrier and serving to demodulate the same, means receiving the demodulated signals for deriving a switching signal in response to the previous synchronizing waveform information, the switching means being responsive to the switching signal and being switched during the blanking interval and prior to the color burst, means serving to receive the signal from the demodulating means and for deriving a local signal frequency and phase and frequency is dependent upon the frequency and phase of the last preceding reproduced color burst, decoding means receiving said frequency for decoding the information line by line, encoding means for re-encoding the information to form a composite signal, a processing amplifier receiving the composite signal for processing the signal to provide a signal having clean synchronizing informations.

6. A system as in claim 5 wherein said processing means comprise blanking means receiving said signal for blanking out the synchronizing pulses and color bursts, synchronizing pulse separating means receiving said signal for separating out the synchronizing pulses, means responsive to said separated synchronizing pulses for forming new synchronizing pulses, gating means connected to receive said new synchronizing pulses and adapted to gate the same in response to the original synchronizing pulses, an adder receiving said gated synchronizing pulses for adding the same to the blanked video signal to thereby re-insert synchronizing pulses in the signal, means responsive to the gated synchronizing pulses for generating substitute synchronizing pulses, gating means serving to receive the substitute synchronizing pulses and serving to pass the same to the gating means in the absence of new synchronizing pulses whereby pulses are added during transients, and means serving to form color bursts information, and means for adding the burst information to said processed video signal whereby a re-processed signal including video signal intelligence, color bursts and synchronizing information is formed.

7. A system as in claim 5 wherein said means receiving the demodulated signal for deriving a switching signal comprises a plurality of multivibrators connected in cascade.

8. A system as in claim 6 wherein said means for generating substitute synchronizing pulses comprises a phantastron oscillator.

9. A ssytem for reproducing either monochrome television signal intelligence including video information and synchronizing waveforms or color television signal intelligence including video information, synchronizing information and color bursts comprising means for reproducing the recording, color circuit means receiving the reproduced color recording for decoding and re-encoding the reproduced color information, processing means receiving the re-encoded information for forming a processed signal, switching means for selectively bypassing the color circuits in response to a control signal, and means responsive to the reproduced signal and for forming a control signal which switches the switching means to bypass the color circuits in the absence of color bursts in the reproduced signal.

References Cited in the file of this patent

UNITED STATES PATENTS

| | | |
|---|---|---|
| Re. 24,956 | Johnson | Mar. 28, 1961 |
| 2,286,450 | White et al. | June 16, 1942 |
| 2,841,642 | Richman | July 1, 1958 |
| 2,979,557 | Schroeder | Apr. 11, 1961 |

OTHER REFERENCES

Video Tape Recorder Uses Revolving Heads, Ross H. Snyder, Electronics, Aug. 1, 1957, pages 138–144.

Magnetic Tape System for Recording and Reproducing Standard FCC Color Television Signals, Olsen et al., RCA Review, September 1956, vol VXII, No. 3, pages 342–347.